(12) United States Patent
Dealy et al.

(10) Patent No.: US 7,293,609 B2
(45) Date of Patent: Nov. 13, 2007

(54) TREATMENT FLUIDS COMPRISING VITRIFIED SHALE AND METHODS OF USING SUCH FLUIDS IN SUBTERRANEAN FORMATIONS

(75) Inventors: Sears T. Dealy, Comanche, OK (US); William J. Caveny, Rush Springs, OK (US); Rickey L. Morgan, Duncan, OK (US); Samuel J. Lewis, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 246 days.

(21) Appl. No.: 10/969,570

(22) Filed: Oct. 20, 2004

(65) Prior Publication Data

US 2006/0081372 A1 Apr. 20, 2006

(51) Int. Cl.
*E21B 33/13* (2006.01)
(52) U.S. Cl. .................. 166/292; 166/312; 166/285
(58) Field of Classification Search ............. 166/285, 166/292, 312
See application file for complete search history.

(56) References Cited

U.S. PATENT DOCUMENTS

| | | | |
|---|---|---|---|
| 3,850,248 A | 11/1974 | Carney | 166/291 |
| 3,896,031 A | 7/1975 | Carney | 252/8.5 C |
| 4,108,779 A | 8/1978 | Carney | 252/8.5 P |
| 4,141,843 A | 2/1979 | Watson | 252/8.55 R |
| 4,217,229 A | 8/1980 | Watson | 252/8.55 R |
| 4,233,162 A | 11/1980 | Carney | 252/8.5 C |
| 4,530,402 A | 7/1985 | Smith et al. | 166/291 |
| 4,536,297 A | 8/1985 | Loftin et al. | 252/8.5 C |
| 4,588,032 A | 5/1986 | Weigand et al. | 166/291 |
| 4,717,488 A | 1/1988 | Seheult et al. | 252/8.551 |
| 5,566,760 A | 10/1996 | Harris | 166/308 |
| 5,716,910 A | 2/1998 | Totten et al. | 507/102 |
| 5,789,352 A | 8/1998 | Carpenter et al. | 507/209 |
| 5,851,960 A | 12/1998 | Totten et al. | 507/118 |
| 5,866,517 A | 2/1999 | Carpenter et al. | 507/226 |
| 5,904,208 A | 5/1999 | Ray et al. | |
| 5,990,052 A | 11/1999 | Harris | 507/217 |
| 6,063,738 A | 5/2000 | Chatterji et al. | 507/269 |
| 6,283,213 B1 | 9/2001 | Chan | 166/291 |
| 6,367,550 B1 | 4/2002 | Chatterji et al. | 166/293 |
| 6,454,008 B1 | 9/2002 | Chatterji et al. | 166/308 |
| 6,566,310 B2 | 5/2003 | Chan | 507/211 |
| 6,619,399 B1 | 9/2003 | Chatterji et al. | 166/293 |
| 6,668,927 B1 | 12/2003 | Chatterji et al. | 166/291 |
| 6,689,208 B1 | 2/2004 | Brothers | 166/794 |
| 6,734,146 B2 | 5/2004 | Chatterji et al. | 507/202 |
| 6,739,806 B1 | 5/2004 | Szymanski et al. | 405/267 |
| 6,908,508 B2* | 6/2005 | Brothers | 106/794 |
| 2004/0107877 A1 | 6/2004 | Getzlaf et al. | 106/813 |
| 2004/0108113 A1 | 6/2004 | Luke et al. | 166/292 |
| 2004/0112600 A1 | 6/2004 | Luke et al. | 166/295 |
| 2004/0171499 A1 | 9/2004 | Ravi et al. | 507/200 |
| 2004/0188091 A1 | 9/2004 | Luke et al. | 166/291 |
| 2004/0188092 A1 | 9/2004 | Santra et al. | 166/291 |
| 2004/0244650 A1 | 12/2004 | Brothers | |

FOREIGN PATENT DOCUMENTS

WO    WO 2005/068582 A2    7/2005

OTHER PUBLICATIONS

Halliburton brochure entitled "Alpha Spacer Cementing Spacer" dated 1999.
Baroid brochure entitled "DEXTRID® Filtration Control Agent" dated 2002.
Halliburton brochure entitled "Dual Spacer System" dated 1999.
Halliburton brochure entitled "Dual Spacer E System" dated 1999.
Halliburton brochure entitled "Dual Spacer Mixing Aid Additive" dated 1999.
Halliburton brochure entitled "Hi-Dense® Weight Additives" dated 1998.
Halliburton brochure entitled "HR®-5 Cement Additive" dated 1998.
Halliburton brochure entitled "Tuned Spacer™ II Material Optimized Rheology Spacer" dated 2004.
Halliburton brochure entitled "WAC-9 Fluid-Loss Additive" dated 1999.
Paper entitled "Spacers and Their Applications In Primary Cementing" by Ronald J. Crook, et al.
Patent Application entitled "Cement Compositions With Improved Fluid Loss Characteristics and Methods of Cementing In Surface and Subterranean Applications" by Rickey L. Morgan, et al., filed Jun. 7, 2003, U.S. Appl. No. 10/608,748.
Patent Application entitled "Compositions Comprising Set Retarder Compositions And Associated Methods" by William J. Caveny et al., filed Jul. 14, 2004, U.S. Appl. No. 10/891,384.
Patent Application entitled "Cement Compositions With Improved Fluid Loss Characteristics and Methods of Cementing In Surface And Subterrnanean Applications" by William J. Caveny et al., filed Sep. 20, 2004, U.S. Appl. No. 10/945,487.
Foreign communication from a related counterpart application dated Feb. 3, 2006.
Paper entitled "Spacers and Their Applications In Primary Cementing" by Ronald J. Crook, et al., May 31, 1979.

* cited by examiner

*Primary Examiner*—David Bagnell
*Assistant Examiner*—Nicole Coy
(74) *Attorney, Agent, or Firm*—Craig Roddy; Baker Botts L.L.P.

(57) ABSTRACT

Methods and compositions for the treatment of subterranean formations, and more specifically, treatment fluids containing vitrified shale and methods of using these treatment fluids in subterranean formations, are provided. An example of a method is a method of displacing a fluid in a well bore. Another example of a method is a method of separating fluids in a well bore in a subterranean formation. An example of a composition is a spacer fluid comprising vitrified shale and a base fluid.

36 Claims, No Drawings

TREATMENT FLUIDS COMPRISING VITRIFIED SHALE AND METHODS OF USING SUCH FLUIDS IN SUBTERRANEAN FORMATIONS

BACKGROUND

The present invention relates to subterranean treatment operations, and more particularly, to improved treatment fluids comprising vitrified shale, and methods of using these improved treatment fluids in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, gravel pack fluids, acidizing fluids, fracturing fluids, spacer fluids, and the like.

Spacer fluids often are used in oil and gas wells to facilitate improved displacement efficiency when displacing multiple fluids into a well bore. For example, spacer fluids often may be placed within a subterranean formation so as to physically separate incompatible fluids. Spacer fluids also may be placed between different drilling fluids during drilling-fluid changeouts, or between a drilling fluid and a completion brine.

Spacer fluids also may be used in primary cementing operations to separate, inter alia, a drilling fluid from a cement composition that may be placed in an annulus between a casing string and the subterranean formation, whether the cement composition is placed in the annulus in either the conventional or reverse-circulation direction. The cement composition often is intended, inter alia, to set in the annulus, supporting and positioning the casing string, and bonding to both the casing string and the formation to form a substantially impermeable barrier, or cement sheath, which facilitates zonal isolation. If the spacer fluid does not adequately displace the drilling fluid from the annulus, the cement composition may fail to bond to the casing string and/or the formation to the desired extent. In certain circumstances, spacer fluids also may be placed in subterranean formations to ensure that all down hole surfaces are water-wetted before the subsequent placement of a cement composition, which may enhance the bonding that occurs between the cement composition and the water-wetted surfaces.

Conventional treatment fluids, including spacer fluids, often comprise materials that are costly and that, in certain circumstances, may become unstable at elevated temperatures. This is problematic, inter alia, because it may increase the cost of subterranean operations involving the treatment fluid.

SUMMARY OF THE INVENTION

The present invention relates to subterranean treatment operations, and more particularly, to improved treatment fluids comprising vitrified shale, and methods of using these improved treatment fluids in subterranean formations.

An example of a method of the present invention is a method of displacing a fluid in a well bore, comprising: providing a well bore having a first fluid disposed therein; and placing a second fluid into the well bore to at least partially displace the first fluid therefrom, wherein the second fluid comprises vitrified shale and a base fluid.

Another example of a method of the present invention is a method of separating fluids in a well bore in a subterranean formation, comprising: providing a well bore having a first fluid disposed therein; placing a spacer fluid in the well bore to separate the first fluid from a second fluid, the spacer fluid comprising vitrified shale and a base fluid; and placing a second fluid in the well bore.

An example of a composition of the present invention is a spacer fluid comprising vitrified shale and a base fluid.

The features and advantages of the present invention will be readily apparent to those skilled in the art upon a reading of the description of the preferred embodiments that follows.

DETAILED DESCRIPTION

The present invention relates to subterranean treatment operations, and more particularly, to improved treatment fluids comprising vitrified shale, and methods of using these improved treatment fluids in subterranean formations. The treatment fluids of the present invention are suitable for use in a variety of subterranean treatment applications, including well drilling, completion, and stimulation operations.

The treatment fluids of the present invention generally comprise vitrified shale and a base fluid. Optionally, the treatment fluids of the present invention may comprise additional additives as may be required or beneficial for a particular use. For example, the treatment fluids of the present invention may include viscosifying agents, organic polymers, dispersants, surfactants, weighting agents, and the like.

The vitrified shale utilized in the treatment fluids of the present invention generally comprises any partially vitrified silica-rich material. Vitrified shale includes any fine-grained rock formed by the consolidation of clay or mud that has been at least partially converted into a crystalline, glassy material by heat and fusion. In certain embodiments of the present invention, the vitrified shale has a percent volume oxide content, as determined by quantitative x-ray diffraction, as set forth in Table 1 below.

TABLE 1

| Oxide | Volume % |
| --- | --- |
| $SiO_2$ | 57–73 |
| $Al_2O_3$ | 15–25 |
| $Fe_2O_3$ | 3–7 |
| CaO | 2–6 |
| $K_2O$ | 1–5 |
| $SO_3$ | 1–3 |
| MnO, SrO, $TiO_2$, BaO, and $Na_2O$ | each <1% |

An example of a suitable vitrified shale is commercially available under the trade name "PRESSUR-SEAL® FINE LCM" from TXI Energy Services, Inc., of Houston, Tex. In certain embodiments of the present invention, the vitrified shale is present in the treatment fluids of the present invention in an amount in the range of from about 0.01% to about 90% by weight of the treatment fluid. In other embodiments of the present invention, the vitrified shale is present in the treatment fluids of the present invention in an amount in the range of from about 1% to about 20% by weight of the treatment fluid. In other embodiments of the present invention, the vitrified shale is present in the treatment fluids of the present invention in an amount in the range of from about 1% to about 10% by weight of the treatment fluid. One skilled in the art, with the benefit of this disclosure, will recognize a suitable amount of vitrified shale for a particular application.

The base fluid utilized in the treatment fluids of the present invention may comprise an aqueous-based fluid, an oil-based fluid, or an emulsion. In certain embodiments of the present invention, the aqueous-based fluid comprises fresh water, salt water, brine, sea water, or a mixture thereof. The base fluid can be from any source provided that it does not contain compounds that may adversely affect other components in the treatment fluid. The base fluid may be from a natural or synthetic source. Generally, the base fluid will be present in the treatment fluids of the present invention in an amount sufficient to form a pumpable slurry. In certain embodiments, the base fluid will be present in the treatment fluids of the present invention in an amount in the range of from about 15% to about 95% by weight of the treatment fluid. In other embodiments, the base fluid will be present in the treatment fluids of the present invention in an amount in the range of from about 25% to about 85% by weight of the treatment fluid. One of ordinary skill in the art, with the benefit of this disclosure, will recognize the appropriate amount of base fluid to use for a chosen application.

Optionally, the treatment fluids of the present invention further may comprise a viscosifying agent. The viscosifying agent may be any component suitable for providing a desired degree of solids suspension. The choice of a viscosifying agent depends upon factors such as the desired viscosity and the desired chemical compatibility with other fluids (e.g., drilling fluids, cement compositions, and the like). In certain embodiments of the present invention, the viscosifying agent may be easily flocculated and filtered out of the treatment fluids of the present invention. Suitable viscosifying agents may include, but are not limited to, colloidal agents (e.g., clays, polymers, guar gum), emulsion forming agents, diatomaceous earth, starches, biopolymers, synthetic polymers, or mixtures thereof. Suitable viscosifying agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, and amino groups. In certain embodiments of the present invention, viscosifying agents may be used that comprise hydroxyl groups and/or amino groups. In certain embodiments of the present invention, the viscosifying agents may be biopolymers, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethyl hydroxypropyl guar, and cellulose derivatives, such as hydroxyethyl cellulose, welan gums, and xanthan gums. Additionally, synthetic polymers that contain the above-mentioned functional groups may be used. Examples of such synthetic polymers include, but are not limited to, poly(acrylate), poly(methacrylate), poly(ethylene imine), poly(acrylamide), poly(vinyl alcohol), and poly(vinylpyrrolidone). Other suitable viscosifying agents include chitosans, starches and gelatins. Suitable clays include kaolinites, montmorillonite, bentonite, hydrous micas, attapulgite, sepiolite, and the like, as well as synthetic clays, such as laponite. An example of a suitable viscosifying agent is a hydroxyethyl cellulose that is commercially available under the trade name "WG-17" from Halliburton Energy Services, Inc., of Duncan, Okla. Another example of a suitable viscosifying agent is a welan gum that is commercially available under the trade name "BIOZAN" from Kelco Oilfield Services, Inc. Where included, the viscosifying agent may be present in the treatment fluids of the present invention in an amount sufficient to provide a desired degree of solids suspension. In certain embodiments, the viscosifying agent may be present in an amount in the range from about 0.01% to about 35% by weight of the treatment fluid. In other embodiments, the viscosifying agent may be present in an amount in the range from about 0.5% to about 2% by weight of the treatment fluid. In certain embodiments of the present invention wherein the treatment fluids will be exposed to elevated pH conditions (e.g., when the treatment fluids will be contacted with cement compositions), viscosifying agents such as welan gum, cellulose (and cellulose derivatives), and xanthan gum may be particularly suitable. One of ordinary skill in the art, with the benefit of this disclosure, will be able to identify a suitable viscosifying agent, as well as the appropriate amount to include, for a particular application.

Optionally, the treatment fluids of the present invention further may comprise a fluid loss control additive. Any fluid loss control additive suitable for use in a subterranean application may be suitable for use in the compositions and methods of the present invention. In certain embodiments, the fluid loss control additive may comprise organic polymers, starches, or fine silica. An example of a fine silica that may be suitable is commercially available from Halliburton Energy Services, Inc. under the trade name "WAC-9." An example of a starch that may be suitable is commercially available from Halliburton Energy Services, Inc. under the trade name "DEXTRID." In certain embodiments where the treatment fluids of the present invention comprise a fluid loss control additive, the fluid loss control additive may be present in the treatment fluids of the present invention in an amount in the range from about 0.01% to about 6% by weight of the treatment fluid. In other embodiments, the fluid loss control additive may be present in the treatment fluids of the present invention in an amount in the range from about 0.05% to about 0.1% by weight of the treatment fluid. One skilled in the art, with the benefit of this disclosure, will recognize the appropriate amount of a fluid loss control additive to use for a particular application.

Optionally, the treatment fluids of the present invention may comprise a dispersant. Suitable examples of dispersants include, but are not limited to, sulfonated styrene maleic anhydride copolymer, sulfonated vinyl toluene maleic anhydride copolymer, sodium naphthalene sulfonate condensed with formaldehyde, sulfonated acetone condensed with formaldehyde, lignosulfonates (e.g., modified sodium lignosulfonate), allyloxybenzene sulfonate, allyl sulfonate and non-ionic monomers, and interpolymers of acrylic acid. An example of a dispersant that may be suitable is commercially available from National Starch & Chemical Company of Newark, New Jersey under the trade name "Alcosperse 602 ND," and is a mixture of 6 parts sulfonated styrene maleic anhydride copolymer to 3.75 parts interpolymer of acrylic acid. Another example of a dispersant that may be suitable is a modified sodium lignosulfonate that is commercially available from Halliburton Energy Services, Inc., of Duncan, Okla., under the trade name "HR®-5." Where included, the dispersant may be present in an amount in the range from about 0.0001% to about 4% by weight of the treatment fluid. In other embodiments, the dispersant may be present in an amount in the range from about 0.0003% to about 0.1% by weight of the treatment fluid. One skilled in the art, with the benefit of this disclosure, will recognize the appropriate amount of dispersant for inclusion in the treatment fluids of the present invention for a particular application.

Optionally, the treatment fluids of the present invention may comprise surfactants. Suitable examples of surfactants include, but are not limited to, nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides, and alkene amidopropyl dimethylamine oxides. An example of a surfactant that may be suitable comprises an oxyalkylated-sulfonate, and is commercially available from Halliburton Energy Services, Inc. under the trade name "STABILIZER 434C." Another surfactant that may be suitable comprises an alkylpolysaccharide, and is commercially available from Seppic, Inc. of Fairfield, N.J. under the trade designation "SIMUSOL-10." Another surfactant that may be suitable comprises ethoxylated nonylphenols, and is commercially available under the trade name "DUAL SPACER SURFACTANT A" from Halliburton Energy Services, Inc. Where included, the surfactant may be present in an amount in the range from about 0.01% to about 10% by weight of the treatment fluid. In other embodiments of the present invention, the surfactant may be present in an amount in the range from about 0.01% to about 6% by weight of the treatment fluid. One skilled in the art, with the benefit of this disclosure will recognize the appropriate amount of surfactant for a particular application.

Optionally, the treatment fluids of the present invention may comprise weighting agents. Generally, any weighting agent may be used with the treatment fluids of the present invention. Suitable weighting materials may include barium sulfate, hematite, manganese tetraoxide, ilmenite, calcium carbonate, and the like. An example of a suitable hematite is commercially available under the trade name "Hi-Dense® No. 4" from Halliburton Energy Services, Inc. Where included, the weighting agent may be present in the treatment fluid in an amount sufficient to provide a desired density to the treatment fluid. In certain embodiments, the weighting agent may be present in the treatment fluids of the present invention in the range from about 0.01% to about 85% by weight. In other embodiments, the weighting agent may be present in the treatment fluids of the present invention in the range from about 15% to about 70% by weight. One of ordinary skill in the art, with the benefit of this disclosure, will recognize the appropriate amount of weighting agent to use for a chosen application.

Optionally, other additives may be added to the treatment fluids of the present invention as deemed appropriate by one skilled in the art with the benefit of this disclosure. Examples of such additives include, inter alia, defoamers, curing agents, salts, corrosion inhibitors, scale inhibitors, and formation conditioning agents. One of ordinary skill in the art with the benefit of this disclosure will recognize the appropriate type of additive for a particular application.

Certain embodiments of the fluids of the present invention may demonstrate improved "300/3" ratios. As referred to herein, the term "300/3" ratio will be understood to mean the value that results from dividing the shear stress that a fluid demonstrates at 300 rpm by the shear stress that the same fluid demonstrates at 3 rpm. When treatment fluids are used as spacer fluids, an ideal "300/3" ratio would closely approximate 1.0, indicating that the rheology of such fluid is flat. Flat rheology will facilitate, inter alia, maintenance of nearly uniform fluid velocities across a subterranean annulus, and also may result in a near-constant shear stress profile. In certain embodiments, flat rheology may reduce the volume of a spacer fluid that is required to effectively clean a subterranean well bore. Certain embodiments of the fluids of the present invention may demonstrate 300/3 ratios in the range of from about 2.7 to about 4.2. Certain embodiments of the fluids of the present invention may maintain a nearly flat rheology across a wide temperature range.

The fluids of the present invention may be prepared in a variety of ways. In certain embodiments of the present invention, the well fluids of the present invention may be prepared by first pre-blending the vitrified shale with certain optional dry additives. Next, the blended dry materials may be mixed with base fluid in the field, either by batch mixing or continuous ("on-the-fly") mixing. In certain embodiments of the present invention wherein the blended dry materials are mixed with base fluid by batch mixing, a weak organic acid and defoamers typically will be premixed into the base fluid. The dry blend then may be added to the base fluid using, e.g., an additive hopper with venturi effects; the mixture of the dry blend and the base fluid also may be agitated, after which the weighting material may be added and agitated. Surfactants may be added to the spacer fluid shortly before it is placed down hole. In certain embodiments of the present invention wherein the blended dry materials are mixed with base fluid by continuous mixing, the blended dry materials typically will be further blended with a weighting material, and the resulting mixture may be metered into, e.g., recirculating cement mixing equipment while the base fluid is metered in separately. The base fluid typically will comprise defoamers pre-blended therein. Shortly before the spacer fluid is placed down hole, surfactants may be added to the spacer fluid.

An example of a method of the present invention is a method of displacing a fluid in a well bore, comprising: providing a well bore having a first fluid disposed therein; and placing a second fluid into the well bore to at least partially displace the first fluid therefrom, wherein the second fluid comprises vitrified shale and a base fluid.

Another example of a method of the present invention is a method of separating fluids in a well bore in a subterranean formation, comprising: providing a well bore having a first fluid disposed therein; placing a spacer fluid in the well bore to separate the first fluid from a second fluid, the spacer fluid comprising a vitrified shale and a base fluid; and placing a second fluid in the well bore.

An example of a composition of the present invention comprises 51.39% water by weight, 3.19% vitrified shale by weight, 43.81% barite by weight, 0.94% sepiolite by weight, 0.034% hydroxyethyl cellulose by weight, 0.08% BIOZAN by weight, 0.006% modified sodium lignosulfonate by weight, and 0.55% citric acid by weight.

To facilitate a better understanding of the present invention, the following examples of preferred embodiments are given. In no way should the following examples be read to limit, or to define, the scope of the invention.

EXAMPLE 1

Rheological testing was performed on a variety of sample compositions that were prepared as follows. First, all dry components (e.g., vitrified shale, or zeolite, or fumed silica, plus dry additives such as, for example, hydroxyethylcellulose, BIOZAN, and sodium lignosulfonate were weighed into a glass container having a clean lid, and thoroughly agitated by hand until well blended. Tap water then was weighed into a Waring blender jar, and the blender turned on at 4,000 rpm. While the blender continued to turn, citric acid was added to the mixing water, and then the blended dry components were added, followed by the barite. The blender speed then was increased to 12,000 rpm for about 35 seconds. Afterwards, the blender was stopped, and about 2 drops of a standard, glycol-based defoamer were added.

Rheological values then were determined using a Fann Model 35 viscometer. Dial readings were recorded at speeds of 3, 6, 30, 60, 100, 200, 300, and 600 RPM with a B1 bob, an R1 rotor, and a 1.0 spring.

In the Sample Compositions described below, all concentrations are in weight percent.

Sample Composition No. 1 comprised a 10 pound per gallon slurry of 75.6% water, 4.83% zeolite, 1.63% sepiolite, 0.04% hydroxyethylcellulose, 0.11% BIOZAN, 0.71% sulfonated styrene copolymer, 0.72% citric acid, and 16.36% barite.

Sample Composition No. 2 comprised a 10 pound per gallon slurry of 75.6% water, 4.83% fumed silica, 1.63% sepiolite, 0.04% hydroxyethylcellulose, 0.11% BIOZAN, 0.71% sulfonated styrene copolymer, 0.72% citric acid, and 16.36% barite.

Sample Composition No. 3 comprised a 10 pound per gallon slurry of 75.6% water, 5.49% vitrified shale, 1.61% sepiolite, 0.07% hydroxyethylcellulose, 0.14% BIOZAN, 0.01% modified sodium lignosulfonate, 0.72% citric acid, and 16.36% barite.

Sample Composition No. 4 comprised a 13 pound per gallon slurry of 51.39% water, 2.81% zeolite, 0.95% sepiolite, 0.02% hydroxyethylcellulose, 0.06% BIOZAN, 0.41% sulfonated styrene copolymer, 0.55% citric acid, and 43.81% barite.

Sample Composition No. 5 comprised a 13 pound per gallon slurry of 51.39% water, 2.81% fumed silica, 0.95% sepiolite, 0.02% hydroxyethylcellulose, 0.06% BIOZAN, 0.41% sulfonated styrene copolymer, 0.55% citric acid, and 43.81% barite.

Sample Composition No. 6 comprised a 13 pound per gallon slurry of 51.39% water, 3.19% vitrified shale, 0.94% sepiolite, 0.034% hydroxyethylcellulose, 0.08% BIOZAN, 0.006% modified sodium lignosulfonate, 0.55% citric acid, and 43.81% barite.

Sample Composition No. 7 comprised a 16 pound per gallon slurry of 36.22% water, 1.54% zeolite, 0.52% sepiolite, 0.01% hydroxyethylcellulose, 0.04% BIOZAN, 0.23% sulfonated styrene copolymer, 0.45% citric acid, and 60.98% barite.

Sample Composition No. 8 comprised a 16 pound per gallon slurry of 36.22% water, 1.54% fumed silica, 0.52% sepiolite, 0.01% hydroxyethylcellulose, 0.04% BIOZAN, 0.23% sulfonated styrene copolymer, 0.45% citric acid, and 60.98% barite.

Sample Composition No. 9 comprised a 16 pound per gallon slurry of 36.22% water, 1.76% vitrified shale, 0.52% sepiolite, 0.023% hydroxyethylcellulose, 0.044% BIOZAN, 0.003% modified sodium lignosulfonate, 0.45% citric acid, and 60.98% barite.

The results of the testing are set forth in the tables below. The abbreviation "PV" stands for plastic viscosity, while the abbreviation "YP" refers to yield point.

TABLE 2

| Sample Composition | Temp. | Viscometer RPM | | | | | | | | PV | YP |
| --- | --- | --- | --- | --- | --- | --- | --- | --- | --- | --- | --- |
| | | 600 | 300 | 200 | 100 | 60 | 30 | 6 | 3 | | |
| 1 | 80 F. | 43 | 30 | 25 | 19 | 15 | 12 | 7 | 6 | 19.5 | 11.9 |
| 1 | 135 F. | 35 | 26 | 21 | 16 | 13 | 11 | 7 | 5 | 16.4 | 10.5 |
| 1 | 190 F. | 31 | 23 | 20 | 16 | 14 | 12 | 9 | 8 | 12 | 12.2 |
| 2 | 80 F. | 40 | 27 | 23 | 19 | 16 | 14 | 9 | 7 | 14.1 | 14.2 |
| 2 | 135 F. | 32 | 24 | 21 | 18 | 15 | 12.5 | 9 | 8 | 12.1 | 13.4 |
| 2 | 190 F. | 29 | 21 | 18 | 15 | 13 | 12 | 9 | 7.5 | 9.9 | 11.9 |
| 3 | 80 F. | 49 | 35 | 29 | 21 | 17 | 13 | 8 | 7 | 18.0 | 15.0 |
| 3 | 135 F. | 49 | 36 | 30 | 23 | 19 | 16 | 10 | 9 | 17 | 18 |
| 3 | 190 F. | 39 | 29 | 24 | 18 | 15 | 12 | 8 | 7 | 14 | 14 |

TABLE 3

| Sample Composition | Temp. | Viscometer RPM | | | | | | | | PV | YP |
| --- | --- | --- | --- | --- | --- | --- | --- | --- | --- | --- | --- |
| | | 600 | 300 | 200 | 100 | 60 | 30 | 6 | 3 | | |
| 4 | 80 F. | 102 | 72 | 59 | 43 | 35 | 28 | 17 | 15 | 48.1 | 26.8 |
| 4 | 135 F. | 77 | 55 | 46 | 36 | 30 | 25 | 16 | 14 | 32.5 | 24.9 |
| 4 | 190 F. | 55 | 40 | 33 | 25 | 21 | 17 | 11 | 10 | 24.9 | 16.7 |
| 5 | 80 F. | 89 | 63 | 51 | 37 | 30 | 23 | 14 | 12 | 43.3 | 22.2 |
| 5 | 135 F. | 63 | 46 | 38 | 29 | 24 | 19 | 12 | 11 | 29 | 19 |
| 5 | 190 F. | 45 | 34 | 27 | 20 | 18 | 15 | 10 | 8 | 20.6 | 14.1 |
| 6 | 80 F. | 84 | 59 | 49 | 37 | 32 | 24 | 16 | 14 | 30.0 | 28.0 |
| 6 | 135 F. | 65 | 46 | 38 | 28 | 23 | 18 | 12 | 10 | 24 | 20 |
| 6 | 190 F. | 51 | 37 | 31 | 24 | 20 | 17 | 11 | 10 | 18 | 19 |

TABLE 4

| Sample Composition | Temp. | Viscometer RPM | | | | | | | | PV | YP |
|---|---|---|---|---|---|---|---|---|---|---|---|
| | | 600 | 300 | 200 | 100 | 60 | 30 | 6 | 3 | | |
| 7 | 80 F. | 172 | 123 | 101 | 75 | 62 | 50 | 36 | 31 | 79.5 | 48.5 |
| 7 | 135 F. | 127 | 92 | 77 | 58 | 49 | 41 | 28 | 26 | 56 | 40 |
| 7 | 190 F. | 105 | 76 | 65 | 51 | 45 | 37 | 27 | 23 | 41.9 | 37.8 |
| 8 | 80 F. | 177 | 127 | 105 | 79 | 65 | 52 | 37 | 34 | 81.3 | 51.2 |
| 8 | 135 F. | 114 | 82 | 69 | 53 | 46 | 39 | 28 | 25 | 47 | 38.4 |
| 8 | 190 F. | 95 | 69 | 57 | 44 | 37 | 31 | 22 | 20 | 41.2 | 30.4 |
| 9 | 80 F. | 109 | 82 | 69 | 52 | 44 | 36 | 26 | 23 | 38.0 | 40.0 |
| 9 | 135 F. | 92 | 67 | 56 | 44 | 37 | 31 | 23 | 21 | 31 | 34 |
| 9 | 190 F. | 75 | 56 | 48 | 39 | 34 | 29 | 22 | 21 | 23 | 32 |

The above Example demonstrates, inter alia, that the improved treatment ids of the present invention comprising vitrified shale and a base fluid may be suitable for use treating subterranean formations.

EXAMPLE 2

Additional Theological testing was carried out on several fluids having the following compositions.

Sample Composition No. 10, a well fluid of the present invention, comprised 60.98% fresh water by weight, 1.76% vitrified shale by weight, 36.22% barium sulfate by weight, 0.52% sepiolite by weight, 0.023% hydroxyethyl cellulose by weight, 0.044% BIOZAN by weight, 0.003% modified sodium lignosulfonate by weight, and 0.45% citric acid by weight.

Sample Composition No. 11 comprised 0.97% bentonite by weight, 27.79% silica flour by weight, 0.2% carboxymethyl hydroxyethyl cellulose by weight, 40.04% barium sulfate by weight, 0.37% by weight of sodium napthalene sulfonate condensed with formaldehyde, and 31.63% fresh water by weight.

Sample Composition No. 12 comprised 2.03% diatomaceous earth by weight, 1.82% coarse silica by weight, 0.1% attapulgite by weight, 0.63% sepiolite by weight, 0.52% by weight of sodium napthalene sulfonate condensed with formaldehyde, 0.1% propylene glycol by weight, 59.1% barium sulfate by weight, and 35.7% fresh water by weight.

The compositions were tested to determine their "300/3" ratios. A viscometer using an R-1 rotor, a B-1 bob, and an F-1 spring was used. The dial readings at 300 RPM (511 sec$^{-1}$ of shear) were divided by dial readings obtained at 3 RPM (5.11 sec$^{-1}$ of shear). The results of the testing are set forth in the table below.

TABLE 5

| Rheology | Sample Composition No. 10 | Sample Composition No. 11 | Sample Composition No. 12 |
|---|---|---|---|
| 300/3 ratio at 80° F. | 4.2 | 11.0 | 9.0 |
| 300/3 ratio at 135° F. | 2.7 | 7.8 | 5.8 |
| 300/3 ratio at 190° F. | 3.0 | 5.3 | 5.6 |

Therefore, the present invention is well adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of displacing a fluid in a well bore, comprising:
   providing a well bore having a first fluid disposed therein; and
   placing a second fluid into the well bore to at least partially displace the first fluid therefrom, wherein the second fluid comprises vitrified shale and a base fluid, and wherein the second fluid is not settable.

2. The method of claim 1 further comprising the step of placing a third fluid in the well bore to at least partially displace the second fluid therefrom.

3. The method of claim 2 wherein the placement of the second fluid and/or the third fluid in the well bore occurs in a reverse-circulation direction.

4. The method of claim 2 wherein the third fluid comprises a cement composition.

5. The method of claim 4 further comprising the step of permitting the cement composition to set in the well bore.

6. The method of claim 1 wherein the first fluid comprises a drilling fluid.

7. The method of claim 1 further comprising the step of placing a casing string within the well bore, wherein the step of placing a casing string within the well bore is performed after the step of providing a well bore having a first fluid disposed therein, and before the step of placing a second fluid into the well bore to at least partially displace the first fluid therefrom.

8. The method of claim 1 wherein the vitrified shale comprises a partially vitrified silica-rich material.

9. The method of claim 1 wherein the vitrified shale is present in the second fluid in an amount in the range from about 0.0 1% to about 90% by weight of the second fluid.

10. The method of claim 1 wherein the vitrified shale is present in the second fluid in an amount in the range from about 1% to about 10% by weight of the second fluid.

11. The method of claim 1 wherein the base fluid comprises at least one of the following: an aqueous-based fluid, an emulsion, a synthetic fluid, or an oil-based fluid.

12. The method of claim 1 wherein the aqueous-based fluid comprises at least one of the following: fresh water, salt water, brine, sea water, or a mixture thereof.

13. The method of claim 1 wherein the base fluid is present in the second fluid in an amount sufficient to form a pumpable slurry.

14. The method of claim 1 wherein the base fluid is present in the second fluid in an amount in the range from about 15% to about 95% by weight of the second fluid.

15. The method of claim 1 wherein the base fluid is present in the second fluid in an amount in the range from about 25% to about 85% by weight of the second fluid.

16. The method of claim 1 wherein the second fluid further comprises a viscosifying agent.

17. The method of claim 16 wherein the viscosifying agent comprises at least one of the following: a colloidal agent, an emulsion forming agent, a diatomaceous earth, or a starch.

18. The method of claim 17 wherein the colloidal agent comprises at least one of the following: a clay, a polymer, or a guar gum.

19. The method of claim 18 wherein the clay comprises at least one of the following: kaolinite, montmorillonite, bentonite, a hydrous mica, attapulgite, sepiolite, or laponite.

20. The method of claim 16 wherein the viscosifying agent is present in the second fluid in an amount sufficient to provide a desired degree of solids suspension.

21. The method of claim 16 wherein the viscosifying agent is present in the second fluid in an amount in the range from about 0.5% to about 2% by weight of the second fluid.

22. The method of claim 16 wherein the viscosifying agent is present in the second fluid in an amount in the range from about 1% to about 10% by weight of the second fluid.

23. The method of claim 1 wherein the second fluid further comprises one or more of a dispersant, a surfactant, or a weighting agent.

24. The method of claim 23 wherein the dispersant comprises a sulfonated styrene maleic anhydride copolymer, a sulfonated vinyltoluene maleic anhydride copolymer, a sodium naphthalene sulfonate condensed with formaldehyde, a sulfonated acetone condensed with formaldehyde, a lignosulfonate, an allyloxybenzene sulfonate, an allyl sulfonate, a non-ionic monomer, or an interpolymer of acrylic acid.

25. The method of claim 23 wherein the dispersant is present in the second fluid in an amount in the range from about 0.0001% to about 4% by weight of the second fluid.

26. The method of claim 23 wherein the dispersant is present in the second fluid in an amount in the range from about 0.0003% to about 0.1% by weight of the second fluid.

27. The method of claim 23 wherein the surfactant comprises at least one of the following: a nonylphenol ethoxylate, an alcohol ethoxylate, a sugar lipid, an $\alpha$-olefinsulfonate, an alkylpolyglycoside, an alcohol sulfate, a salt of ethoxylated alcohol sulfate, an alkyl amidopropyl dimethylamine oxide, or an alkene amidopropyl dimethylamine oxide.

28. The method of claim 23 wherein the surfactant is present in the second fluid in an amount in the range from about 0.0 1% to about 10% by weight of the second fluid.

29. The method of claim 23 wherein the surfactant is present in the second fluid in an amount in the range from about 0.0 1% to about 6% by weight of the second fluid.

30. The method of claim 23 wherein the weighting agent comprises at least one of the following: barite, hematite, manganese tetraoxide, ilmenite, or calcium carbonate.

31. A method of separating fluids in a well bore in a subterranean formation, comprising:

providing a well bore having a first fluid disposed therein;

placing a spacer fluid in the well bore to separate the first fluid from a second fluid, the spacer fluid comprising a vitrified shale and a base fluid, and wherein the spacer fluid is not settable; and placing a second fluid in the well bore.

32. The method of claim 31 wherein the first fluid is a drilling fluid.

33. The method of claim 31 wherein the second fluid is a cement composition.

34. The method of claim 33 further comprising permitting the cement composition to set in the well bore.

35. The method of claim 31 wherein the placement of the spacer fluid and/or the second fluid in the well bore occurs in a reverse-circulation direction.

36. The method of claim 31 wherein the vitrified shale is present in the spacer fluid in an amount in the range of from about 0.01% to about 90% by weight of the spacer fluid.

* * * * *